US009021254B2

(12) United States Patent
Bokarius et al.

(10) Patent No.: US 9,021,254 B2
(45) Date of Patent: Apr. 28, 2015

(54) MULTI-PLATFORM USER DEVICE MALICIOUS WEBSITE PROTECTION SYSTEM

(71) Applicant: White Sky, Inc., Mountain View, CA (US)

(72) Inventors: Konstantin Bokarius, Sunnyvale, CA (US); Juan Gamez, Foster City, CA (US); Pankaj Srivastava, Santa Clara, CA (US)

(73) Assignee: White Sky, Inc., Mountain View, CA (US)

(*) Notice: Subject to any disclaimer, the term of this patent is extended or adjusted under 35 U.S.C. 154(b) by 0 days.

(21) Appl. No.: 14/194,703

(22) Filed: Mar. 1, 2014

(65) Prior Publication Data

US 2014/0181931 A1 Jun. 26, 2014

Related U.S. Application Data

(63) Continuation-in-part of application No. 13/277,216, filed on Oct. 20, 2011, now abandoned, which is a continuation-in-part of application No. 12/754,086, filed on Apr. 5, 2010, now Pat. No. 8,438,383, which is a continuation-in-part of application No. 11/881,482, filed on Jul. 27, 2007, now Pat. No. 8,095,967.

(51) Int. Cl.
*G06F 21/00* (2013.01)
*H04L 29/06* (2006.01)
(Continued)

(52) U.S. Cl.
CPC ............ *H04L 63/0823* (2013.01); *G06F 21/41* (2013.01); *G06F 21/52* (2013.01); *G06F 21/554* (2013.01); *G06Q 10/10* (2013.01); *G06Q 30/06* (2013.01); *G06Q 40/02* (2013.01); *H04L 9/3265* (2013.01); *H04L 63/083* (2013.01); *H04L 63/1483* (2013.01); *H04L 2209/56* (2013.01)

(58) Field of Classification Search
CPC .............. H04L 63/083; H04L 63/1483; H04L 63/0823; G06F 21/41; G06F 21/52; G06F 21/554
USPC .................................. 713/155; 715/206–207
See application file for complete search history.

(56) References Cited

U.S. PATENT DOCUMENTS

2004/0225877 A1* 11/2004 Huang .......................... 713/100
2005/0065961 A1* 3/2005 Aguren ......................... 707/102

(Continued)

*Primary Examiner* — Harunur Rashid
*Assistant Examiner* — Angela Holmes
(74) *Attorney, Agent, or Firm* — Richard B. Main; Main Law Firm

(57) ABSTRACT

A security system for defending online users against fraudsters and malicious websites comprises a back-end network server and appropriate apps for each protected user device. An otherwise conventional network server is enhanced with application software instructions for a centralized software-as-a-service (SaaS) to respond to network requests from user devices operating variously under ANDROID-type, APPLE IOS-type, and MICROSOFT WINDOWS-type operating systems. The SaaS investigates, surveys, and watches websites. It calculates confidence scores related to financial fraud and the acceptability and risk to said users of visiting particular websites. It maintains a trusted network database of website URL's calculated to belong to financial websites that can be trusted and present acceptable levels of fraud and financial risk to its visitors. Each user device application provides for secure password management and access via a security browser to websites in the trusted network.

6 Claims, 7 Drawing Sheets

(51) Int. Cl.

| | |
|---|---|
| ***G06F 21/41*** | (2013.01) |
| ***G06F 21/52*** | (2013.01) |
| ***G06F 21/55*** | (2013.01) |
| ***G06Q 10/10*** | (2012.01) |
| ***G06Q 30/06*** | (2012.01) |
| ***G06Q 40/02*** | (2012.01) |
| ***H04L 9/32*** | (2006.01) |

(56) References Cited

U.S. PATENT DOCUMENTS

2008/0256602 A1* 10/2008 Pagan .............................. 726/3
2011/0030058 A1* 2/2011 Ben-Itzhak et al. ............ 726/24

* cited by examiner

100
Trusted Network Server
110
white-list of websites
108
XPaths
112
special-purpose algorithms
124
updates
Internet
122
trivial
120
non-trival
financial website
simple
navigation
webpages
102
103
complex
104
105

200
FINANCIAL WEB SITE A
204
BOGUS FINANCIAL WEB SITE A
210
FINANCIAL WEB SITE N
206
URL's = IP ADDRESSES
213
INTERNET
208
DOMAIN NAME SERVER
212
EMAILS
240
EMAIL PROGRAM
242
USER COMPUTER
202
security browser
218
BROWSER PLUG-INS
216
conventional browser
214
AGENT PROGRAM
230
220
PASSWORD STORE
222
USER SIGN-ON CREDENTIALS
220
USER WEB SITE DATABASE
224
DIGITAL SIGNATURE
223
WEB SITE DATABASE SERVER
226

300
Personal Data Protection Suite
Home
Credit Cards
Options
MY ONLINE ACCOUNTS
Add Financial Accounts...
Charles Schwab & Co.
PayPal
Safe -California
320
Add Other Accounts...
eBay
Toyotafinancial
322
ADDITIONAL SERVICES INCLUDED
Security Suite
312
Install Now
304
Learn More
308
IDENTITY
313
Enroll Now
305
Learn More
709
Secure Backup
314
Install Now
306
Learn More
310
Toolbar
315
Install Now
307
316
301
302

400
user computer operating system
change posters
bulletin-board management process 406
new posters
URL
URL
402 bulletin-board process
poster process 404
poster process 405
click
click
click
click
GUI 300
button
304
hyperlink
308
312
button
305
hyperlink
309
313

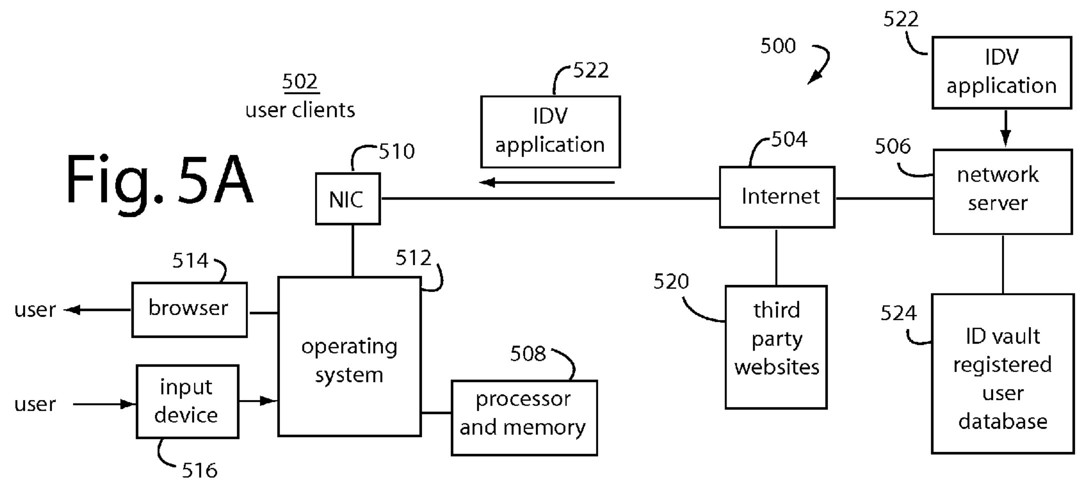
transforms into
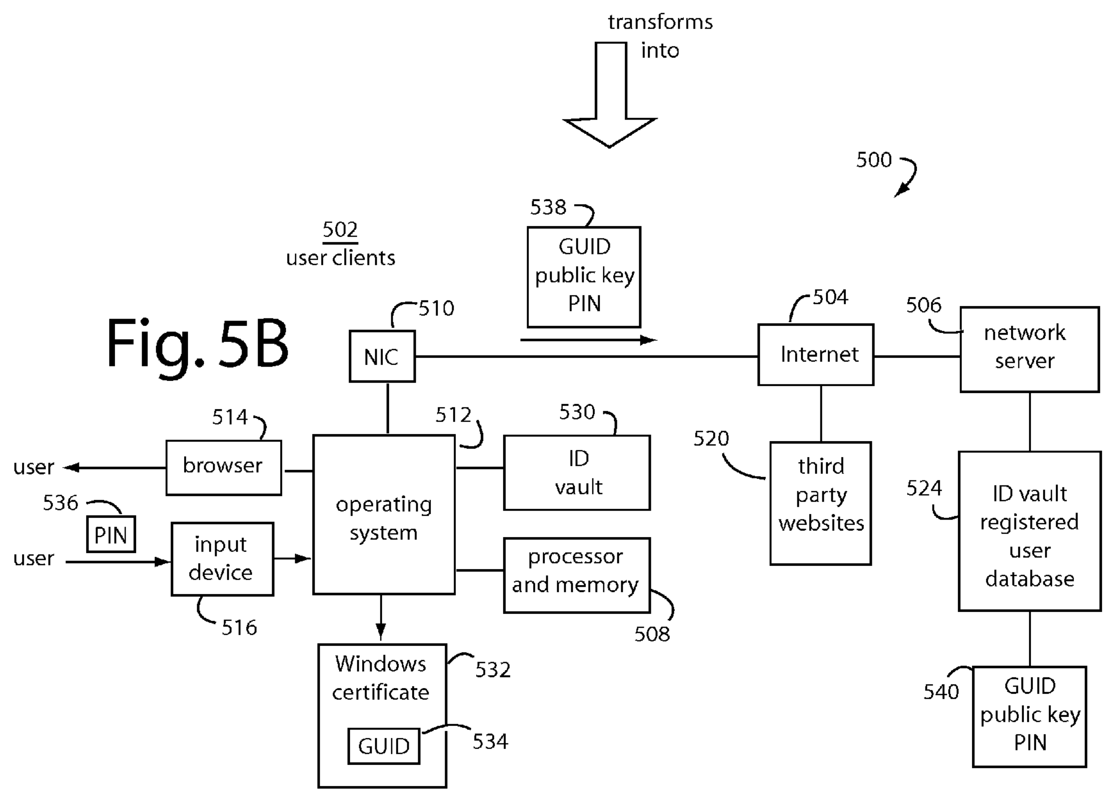

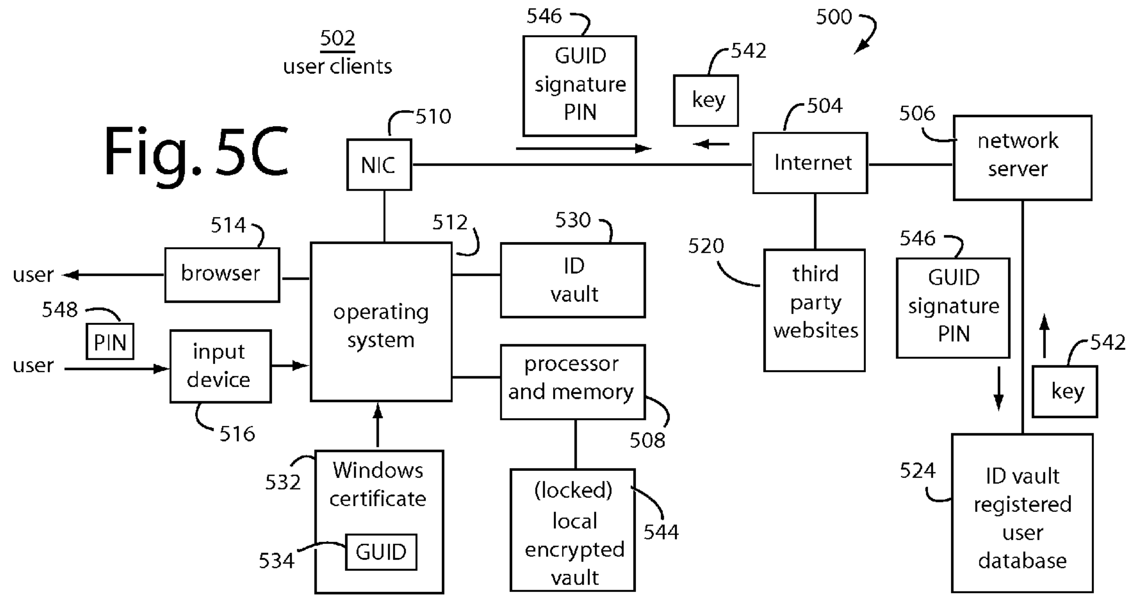

Fig. 5C
500
502
user clients
546
GUID
signature
PIN
542
key
510
NIC
504
Internet
506
network
server
514
browser
512
530
ID
vault
520
third
party
websites
546
GUID
signature
PIN
542
key
user
548
PIN
user
input
device
operating
system
processor
and memory
508
516
532
Windows
certificate
534
GUID
(locked)
local
encrypted
vault
544
524
ID vault
registered
user
database

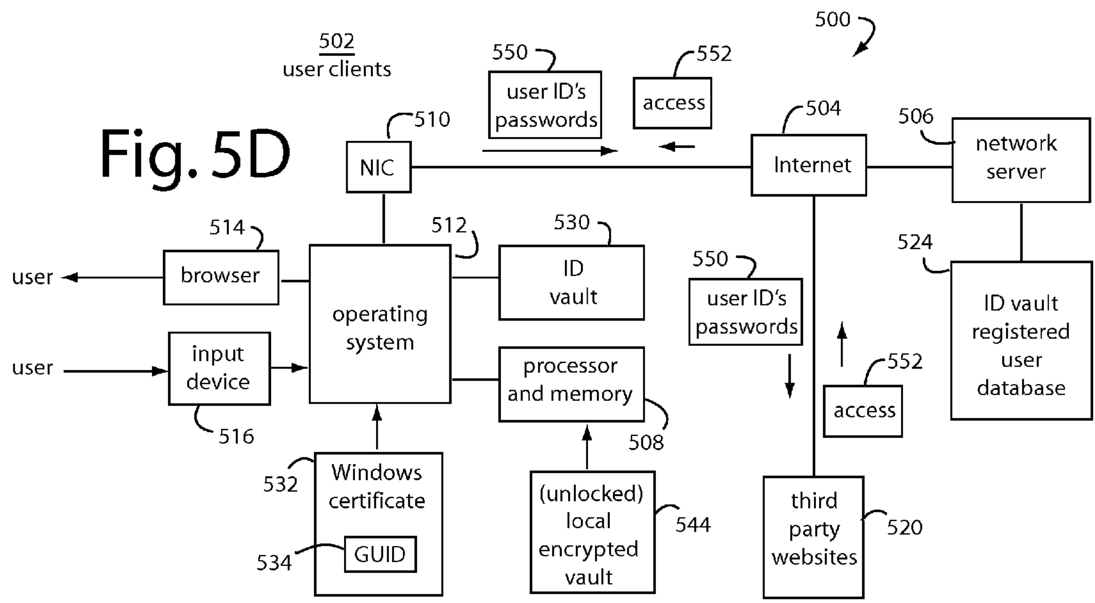

Fig. 5D
500
502
user clients
550
user ID's
passwords
552
access
510
NIC
504
Internet
506
network
server
514
browser
512
530
ID
vault
550
user ID's
passwords
524
ID vault
registered
user
database
user
user
input
device
operating
system
552
access
processor
and memory
508
516
532
Windows
certificate
534
GUID
(unlocked)
local
encrypted
vault
544
third
party
websites
520

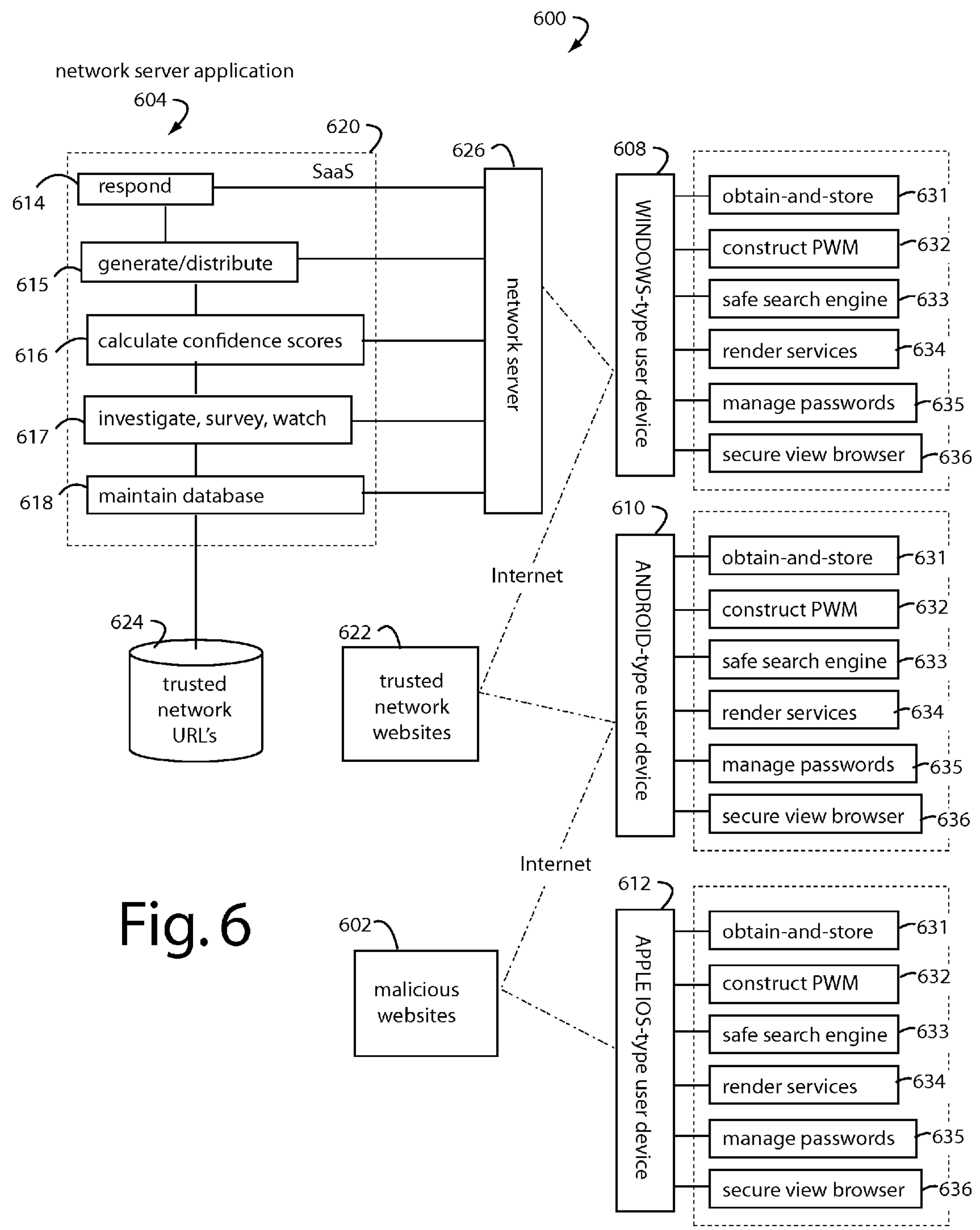
600
network server application
604
620
SaaS
626
608
respond
614
generate/distribute
615
calculate confidence scores
616
investigate, survey, watch
617
maintain database
618
network server
WINDOWS-type user device
obtain-and-store
631
construct PWM
632
safe search engine
633
render services
634
manage passwords
635
secure view browser
636
610
ANDROID-type user device
Internet
624
trusted network URL's
622
trusted network websites
Internet
612
APPLE IOS-type user device
602
malicious websites
Fig. 6

MULTI-PLATFORM USER DEVICE MALICIOUS WEBSITE PROTECTION SYSTEM

BACKGROUND OF THE INVENTION

1. Field of the Invention

The present invention relates to the safe navigation and browsing by a user of their financial institution websites, and more particularly to equipping multiple types of user device platforms with secure-view browsers which operate only with member sites in a trusted network.

2. Description of Related Art

Who to trust or work with on the Internet is no longer obvious to the average consumer. Many websites pose as wolves in sheep's clothing, looking benign or familiar but in reality waiting to spring on the unsuspecting. Consumers need tools and friends they can trust to help protect them from loses and other catastrophes.

CONSTANT GUARD™ by XFINITY is an online protection suite that securely stores passwords for easy access to users' favorite websites. Strong passwords offer the most protection when accessing and using financial websites, but remembering and safeguarding them increases in difficulty with their complexity and single-purpose uses. The Service includes security notices when risks have been detected for particular users.

Vance Bjorn, et al., observed in United States Patent Application Publication US 2010-013203, published May 27, 2010, that as users become more active on computers, their concerns about identity protection increase. Users are concerned about the security of their digital identity. There are numerous tools to protect various aspects of identity. However, in the prior art, each of these aspects of a user's digital identity must be individually handled. The user can download anti-virus software, encryption software, and other tools to attempt to protect their system and identity. One of the biggest concerns for users is passwords used to access accounts ranging from 401K accounts, to bank accounts, and email. Stories about users' passwords being stolen or compromised are abundant. Users want privacy of their account, but they also want convenience. With the huge numbers of accounts that most users have these days, there is often a problem with choosing passwords for each of them, and ensuring that those passwords are of sufficient complexity and changed regularly. This causes many millions of dollars of loss, to consumers as well as banks and other institutions.

But Bjorn offered no sign-on automation, no enhanced security protection for passwords used in the browser, no URL white lists, etc. Bjorn manages passwords, their strength, like in a vault authenticated by biometrics hardware and a server. A better solution would be all software, however Bjorn relies on biometric hardware and on-premise server components.

Bjorn is also not multi-tenant. Multi-tenancy involves a single instance of software run on a server that serves multiple client-organizations, or tenants. Multi-tenant architectures virtually partition data and configurations, each client organization works with a customized virtual app instance.

Bjorn depends on biometrics and does not authenticate using a PIN service. Bjorn requires clients to use buy and deploy biometrics hardware to talk to their backend. The identity protection suite (IPS) system from Bjorn is about managing users, identities, password strength, and their permissions. Instead of using each as they come from the financial institutions in support of online accounts. Bjorn do not interact with the websites, which seems to be a miscalculation. Bjorn provides access to passwords, e.g., for users to copy and then sign on manually into their site. As a result, they do not offer the enhanced security that is possible.

Bjorn does not appear to be targeting consumers, they seem more about the enterprise. You can't get data protection as a consumer, a given enterprise buys the client/server solution and only then can it be deployed to their users. Bjorn describes on-premise solutions for the enterprise to integrate and then offer the results to their users.

No one computer security application can do it all and free competition has resulted in hundreds, if not thousands of offerings that promise many perspectives on similar problems. Advertising has been the traditional solution to finding customer for products and for customers to understand what's available.

New technologies can be "pushed" to market and market demand can "pull" sales. In a marketing "pull" system the consumer requests the product and "pulls" it through the delivery channel.

Push marketing can be interactive, especially when the Internet is used as the communications channel. Amazon and other retailers learned long ago that sales can be enhanced if they suggest or push related products to those in a buyer's "shopping cart". Buyers are given the opportunity to click on the suggested products, often saying other buyers had bought these as well. Protection suites are collections of best-in-class computer security products that make good sense when used in combination together. For example, NORTON™ SECURITY SUITE, IDENTITY GUARD®, SECURE BACKUP & SHARE, XFINITY™ TOOLBAR, etc.

SUMMARY OF THE INVENTION

Briefly, a back-end service maintaining a database of trusted network URL's works with a user device application program. This includes an online protection suite that provides subscribers to organizations a highly integrated application for mobiles and desktops with a dashboard set of services combining single-click secure access with a private security browser to user accounts on a financial website belonging to a trusted network, and a bulletin-board of constantly refreshed posters offering a variety of related products and services.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIGS. 5A-5D are functional block diagrams of a user authentication system embodiment of the present invention with a network server and a client for user authentication; and FIG. 6 is a functional block diagram of a computer network system consisting of backend cloud servers and many user devices for defending the users when online on the Internet against fraudsters and malicious websites.

DETAILED DESCRIPTION OF THE EMBODIMENTS

Figure 1:
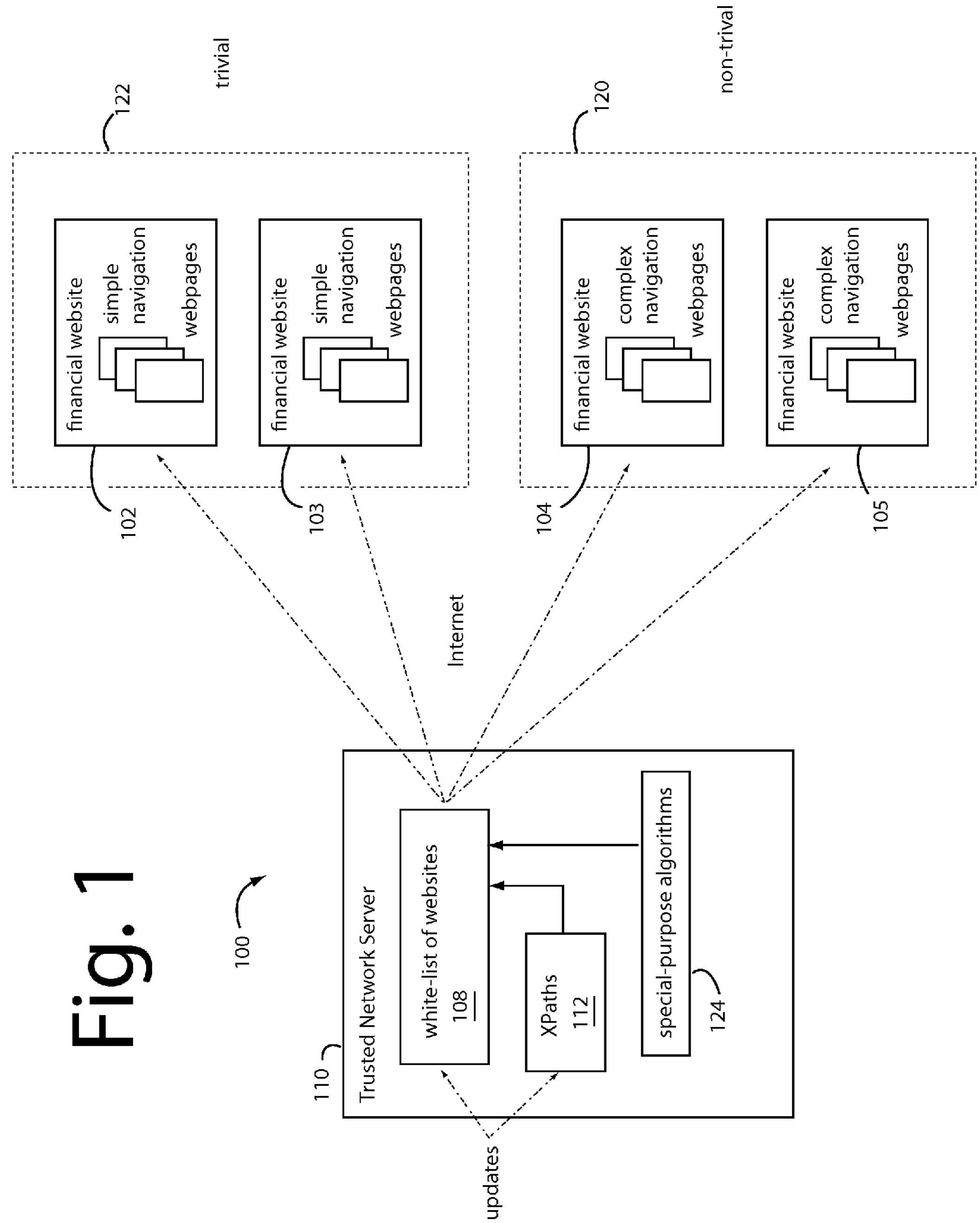
FIG. 1 is a functional block diagram of a trusted network server and the white list websites it tracks and catalogs.

Referring to FIG. 1, embodiments of the present invention recognize various financial websites as belonging to a Trusted Network (TN) 100 of their own construction. The purpose of assembling together Trusted Networks is build information about the constituent websites 102-105, e.g., that includes every existing financial institution likely to be accessed by a user. The URL web addresses of the sign-on pages for the websites are stored in a white-list 108 of Trusted Network Sever 110 to later enable secure logging of users onto the right websites. The corresponding XML Path Language (XPath) locations for each login element on a sign-on page are also stored in an XPaths list 112 for automated use later. These login elements typically include a username field, a password field, and a submit button.

Some websites 104-105 use more complex sign-on processes, which may involve more login elements and even multiple sign-on pages. All of which each Trusted Network must support. These XPaths allow embodiment applications to automatically record and playback for login corresponding users' accounts. Only non-trivial sites 120 use XPaths, trivial sites 122 do not need them.

A variety of login-related options are needed to assist the applications to automatically record and play back account data need to access a given Trusted Network site 102-105.

A validated IP-address from a secure database of white-listed IP addresses is calculated for each trusted website by server 110. A list 108 of valid IP addresses is maintained for each website, the applications provide users security against phishing attacks which try to redirect the user to a malicious website.

There are two categories in each Trusted Network, trivial 122 and non-trivial 120. The non-trivial websites 104-105 are more complex and require XPaths to be recorded in list 112 and played back properly. Trivial sites 102-103 are less complex and can be recorded and played back using special-purpose algorithms 124 in real-time, without the need of XPaths. The special purpose algorithms are actually stored for real-time use inside each PC client application, and do not always reside in the Trusted Network server. The level of maintenance required for each Trusted Network can be reduced when websites can be marked as trivial and the recording and playback can be left to simple algorithms.

The Trusted Network server 110 is constantly maintained and updated by a service team. The types of updates include:

1. Adding new Trusted Network sites 102-105 representing new financial institution presences;
2. Removing existing Trusted Network sites for financial institutions that go out of business;
3. Merging Trusted Network sites for financial institutions that merge with other financial institutions;
4. Updating the XPaths and login-related options to ensure that accounts for all non-trivial Trusted Network sites can be automatically recorded and played back. Users typically inform the service team of Trusted Network sites that need to be updated. These are updated by running automated tools that verify the XPaths, analyzing reports from the field for users that failed to properly record or playback a Trusted Network site, or by investigating specific customer issues submitted to a support department; and
5. Updating the white-listed IP addresses for all Trusted Network sites by running automated tools that ping each Trusted Network site, analyzing reports from the field from users that attempted to open a website with an IP address that was not in the white-list, and by investigating specific customer issues submitted to the support department.

Trusted Network server 110 can be hosted by a Microsoft SQL Server database in the back-end infrastructure of a service provider. The most recent copies of the SQL database are cached by encrypted data files on the local computer, e.g., for users that have a PC version of the application installed. The most recent Trusted Network database can be consulted using a web service to deliver database updates in real time, as requested by the client application. Each support team utilizes proprietary and custom built tools to manage and maintain the integrity of the Trusted Network. A mobile version differentiates Trusted Network sites depending on the specific platform that the websites target, e.g., PC vs. phone vs. tablet.

Embodiments of the present invention pop-up an additional, special security browser to steer users a safe way when accessing, navigating and browsing their financial institution websites. A so-called SecureView browser is tightly integrated with an identity protection suite application, and can be used only to record and playback the users' saved Trusted Network accounts. Only accounts for sites that are part of the Trusted Network can be opened with SecureView browser, and accounts that are not part of the Trusted Network remain accessible in a conventional browser.

SecureView browser is essentially a customized Microsoft Internet Explorer web browser, which is built and developed by assembling a large number of code classes, events, interfaces, and enumerations, all connecting and integrating into a usable web browser. Some public code had to be modified to implement various customizations of the SecureView browser code. A web browser wrapper control program like can be found at www.codeproject.com would be useful in the construction of a security browser like that described herein. The SecureView browser is differentiated from conventional web browsers by a non-existent URL address bar at the top of the browser. Just about all conventional browsers allow the user to navigate to a different sites by typing the web URL address into the top navigation bar. Conversely, the SecureView browser does not include this navigation bar, and therefore limits the users navigating only Trusted Network sites.

Internet Explorer and other conventional web browsers allow the user or third-party applications to install extensions. These custom components can be malicious, or at best innocently reduce the overall security of the user's web browsing session by introducing new attack vectors for hackers and other malware. SecureView browsers eliminate these potential threats by preventing extensions from being loaded within all active sessions.

Internet Explorer and other web browsers universally allow custom content to be loaded and executed from websites. Such can be malicious and dangerous to the user's system. Everyday custom content includes Flash movies and ActiveX controls. SecureView browsers eliminate the risks of custom content by preventing it from being loaded. Only basic web content such as HTML and JavaScript is allowed to be loaded and executed. Given that the SecureView browser is only used with Trusted Network sites, and the vast majority of Trusted Network sites are financial sites, and most financial sites don't need or use custom content such as Flash, the user's SecureView web browsing experience is not adversely impacted.

IP address level security is implemented, where only white-listed IP addresses are stored in the Trusted Network for a given site and are allowed only for that specific site. If an attempt is made to open a website whose IP address is not white-listed, then SecureView browser will display an error message and prevent the user from navigating that site.

In order to record and playback trivial Trusted Network sites, the SecureView browser uses algorithms that were developed and refined by the present inventors over a period of years. These algorithms were designed to detect the sign-on process and identify all login elements and their associated XPaths in real-time, thus allowing many sites in the Trusted Network to be marked as trivial and eliminating the need to store and maintain XPaths for those sites.

Figure 2:
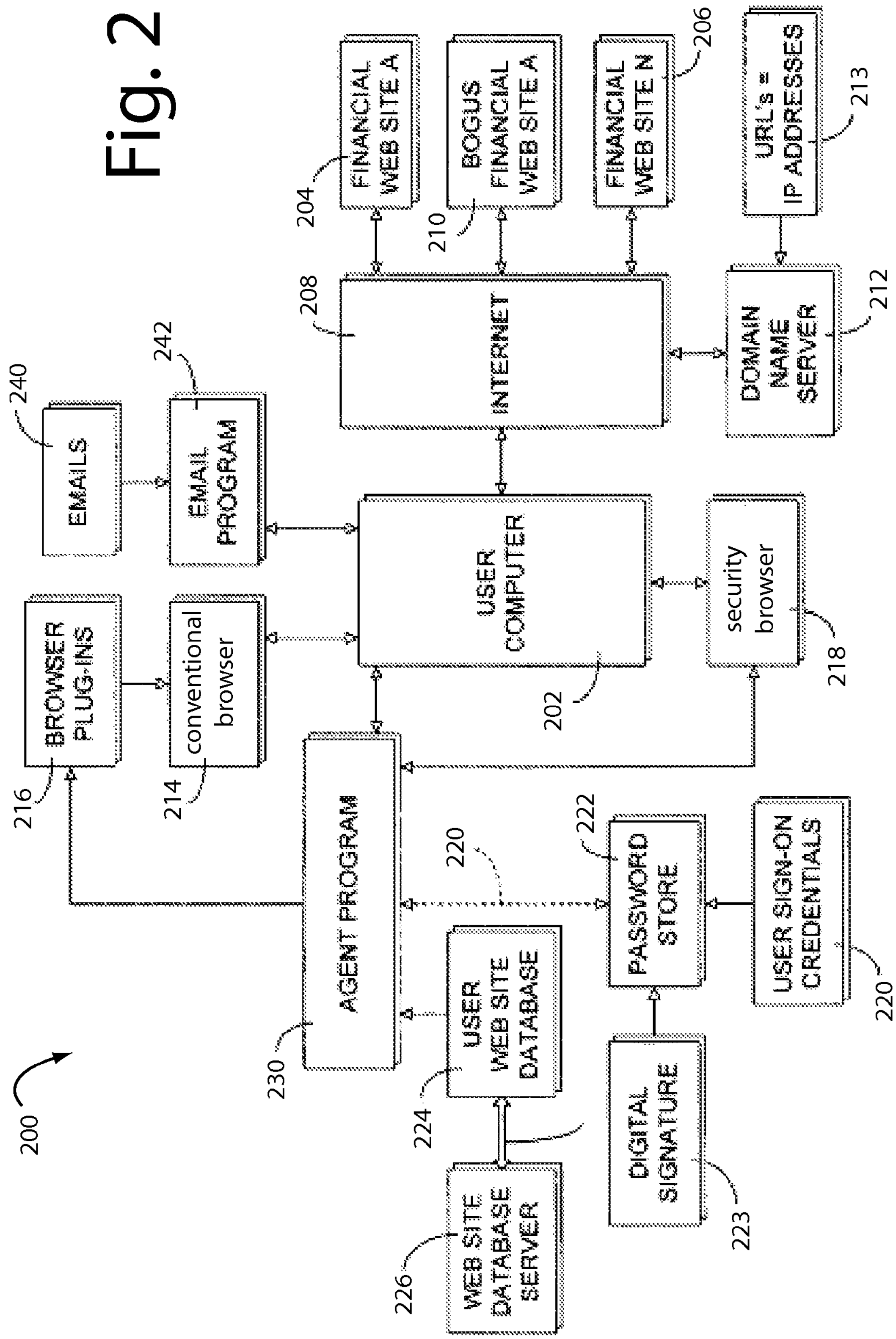
FIG. 2 is a functional block diagram of a secure authentication system that detects and prevents phishing and pharming attacks for specific websites.

FIG. 2 represents an identity protection suite and system 200 in one embodiment of the present invention that attaches to conventional elements in a user computer 202. Such is used by ordinary consumers to access legitimate financial websites 204 and 206 through the Internet 208. For example, white-listed websites 102-105 in FIG. 1. Bogus websites 210 can and often try hard to impersonate legitimate ones, and these attempts are detected and recognized as being false by system 600. For example, with the help of trusted network server 110 of FIG. 1.

A conventional domain name server (DNS) 212 provides true IP-addresses 213 when a conventional browser 214 is used to surf the Internet 208 and gives it a target uniform resource locator (URL) to use. This conventional browser accepts conventional browser plug-ins 216.

Bogus websites 210 try to confuse lay users by posting deceptive and similar looking URL's, but these will translate by the DNS 212 to very different, and wrong IP-addresses. For example, "citibank.com" and "citybank.com" will have very different IP addresses, one benign and one malicious. Users never see the actual IP address they wind up at, and if they do it just looks like meaningless numbers. Once a user logs on to a malicious website, they can easily become a new victim.

A private, security browser 218 presents a new user display window referred to herein as "SECURE VIEW", and it can only be directed to particular trusted network websites by agent program 210, and not those innocently directed by the user. It has no address line to input URL's, and it does not permit browser plug-ins 216 like conventional browsers 214 do. In some embodiments, when a user navigates to a website using conventional browser 214, security browser 218 will pop up and replace the conventional browser's user display window. This is especially true when the user attempts to provide user credentials 220, such as a User-ID and password.

A dedicated secure storage file 222 keeps user sign-in credentials 220. A digital signature 223 is occasionally needed to keep the secure store 222 open, e.g., for thirty minutes or until the user logs out.

A database 224 of information about specific websites is refreshed by a website database server 226, which is equivalent to trusted network server 110 in FIG. 1. All user web activity is monitored by an agent program 230. When the user attempts to send sign-in credentials 220 to any website using the Secure View browser, agent program 230 will allow and control it if the IP address of the website's IP address matches a white-list IP addresses already stored in the website database 224 (also 108 in FIG. 1). Such IP-addresses must correspond with those registered to the sign-in credentials the user is attempting to send.

System 200 will detect mismatches between URL's and the legitimate IP-addresses belonging to those websites. This and the use of security browser 218 provides better protection by not allowing user credentials (ID, passwords, etc.) to be supplied to any websites unless the destination URL is one that is already known, verified, and trusted.

When a user sends anything to a website using a regular web browser (i.e., without using Secure View), agent program 230 checks the POST data text against all the user credentials 220 which are stored in password store 222. If it seems no user credentials are being attempted to be sent, agent program 230 will allow the data to be passed on to the website using the conventional browser.

However, in some early embodiments of the present invention if a match occurs, it means the user is attempting to POST a sign-on credential. In such cases, the user is warned via a Windows dialog box that they are sending their credentials to a potentially unsafe and unverified site and provided an option to either cancel or continue the sign-on process.

Further, if a user navigates to a website stored in the Trusted Network using a regular web browser, then the agent program displays a Windows dialog box that encourages the user opts to open that website in the Secure View browser instead. The user can then either choose to proceed with using the regular web browser or choose to open that website in Secure View—if the latter option is chosen, then the agent program will automatically close the regular web browser and automatically open Secure View to the specific site the user had open in the regular browser.

If the credential is accepted by the website contacted, a user session is opened only in the security browser. But this can sometimes fail and special procedures are needed for particular websites like citibusiness.com and paypal.com working through ebay.com. Appropriate access is conducted to the financial websites with which the user has accounts, and prevents any access with bogus websites. Or it at least warns the user that the website the user is attempting to contact is not a trusted network website.

Conventional emails 240 can be received and sent by a conventional email program 242 installed on user computer 202.

Figure 3:
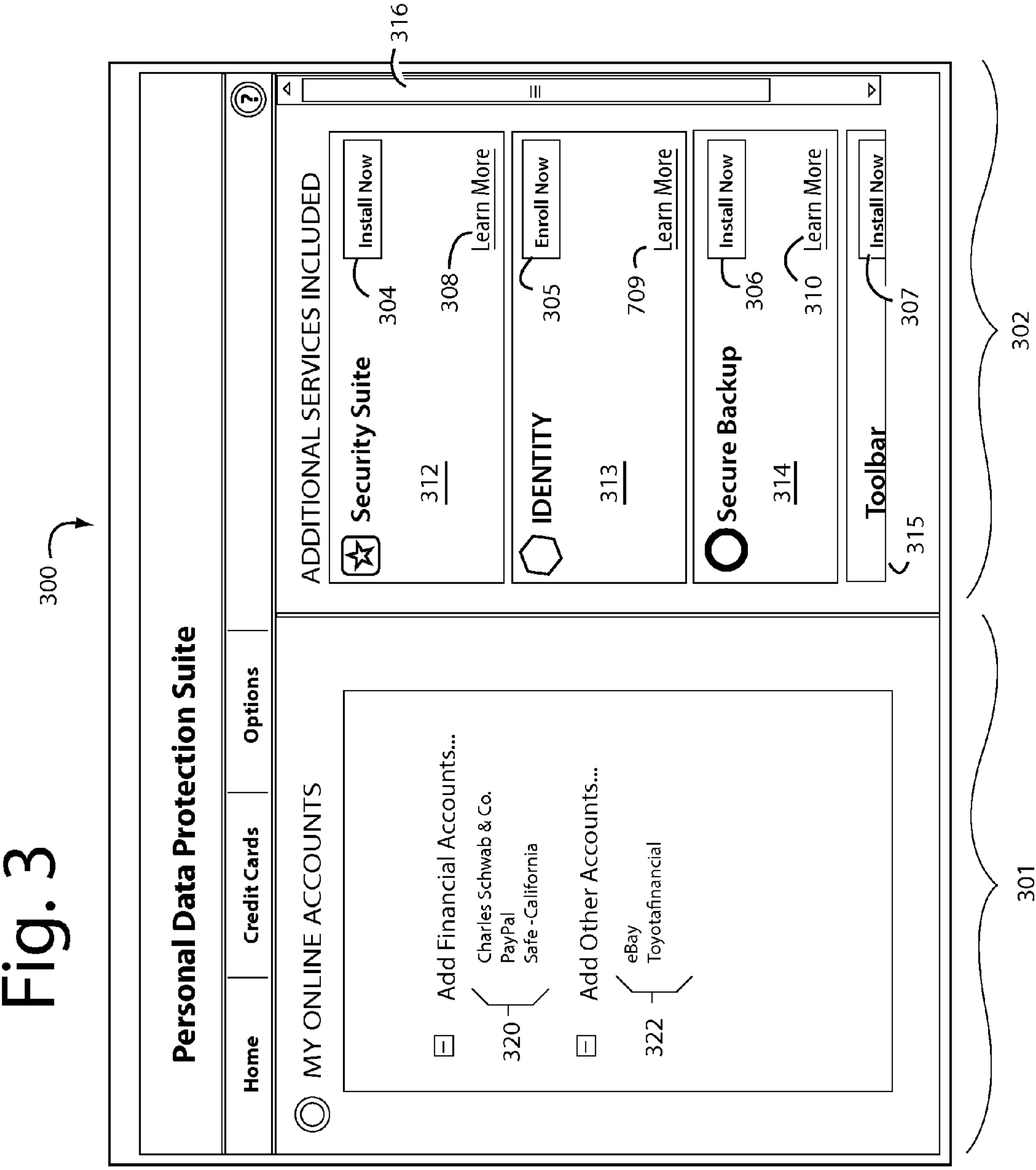
FIG. 3 is a diagram of a graphical user interface (GUI) in a dashboard configuration that can be effectively connected to and used with the system herein.

FIG. 3 represents a graphical user interface (GUI) 300 in a dashboard configuration that can be displayed on a typical monitor screen and interacted with using a mouse which are a part of user computer 202 in FIG. 2. Such hardware components are conventional, and universal. So describing them further here is not necessary.

GUI 300 is a type of user interface that allows users to interact with icon images rather than text commands. It is implemented as a display image window on a user display connected to user computer 202 and works with a mouse pointing device. Such desk-top metaphor experience is well known to Microsoft WINDOWS users. Conventional browser 214 and security browser 218 also display windows on such user display. Touchscreens on mobile smartphones using ANDROID or iOS provide similar experiences and capabilities.

GUI 300 includes a split into two or more parts, e.g., a left half 301 and a right half 302. Here, the left half 301 is devoted to managing the protection mechanisms described in connection with FIG. 2. The right half 302 is devoted toward driving the purchase and engagement of related security applications and services that can be downloaded and run effectively in combination with system 200 and GUI 300. As a consequence, the right half 302 benefits from the constant exposure to the users' "eyeballs". The split into left and right halves 301 and 302 is arbitrary, and such could be reversed and still yield the same benefits.

In the example, FIG. 3 represents a protection suite embodiment of the present invention that has been marketed by White Sky, Inc. as its PERSONAL DATA PROTECTION SUITE™ and distributed by XFINITY to its high-speed Internet customers. The theme here is computer security, and the left and right halves 301 and 302 are complementary. Other themes are possible where the services offered enhance the main application and user interests.

In the case of Internet Service Providers (ISP's) and others like XFINITY, they offer several benefits to their subscribers that can be collected and presented in an organized way on the right half 302. Otherwise, these many benefits can go unrecognized and underutilized by the population of subscribers and customers. The American Association of Retired Persons (AARP) would be another example of an organization that offers hundreds of programs and benefits to its members, such as health insurance, hotel discounts, travel incentives, Social Security, voting and campaigns, etc. Here, the left half 301 would be used for AARP functions, and the right half 302 for services, programs, and discounts offered only to AARP members.

As used herein, a hyperlink is a reference to a document that a reader can follow directly or automatically. They can be represented as highlighted or underlined text, or as buttons that look like they could be pushed with a finger. Hyperlinks can point to whole documents or webpages, or to specific elements within them. Hypertext is text that embeds hyperlinks. Hyperlinks have anchors which are the locations within documents from which hyperlinks are followed. The document with the hyperlink is the source document. The target of the hyperlink can be a document, or a location within a document to which the hyperlink points. Users can activate and follow links when their anchors are shown, e.g., by clicking on the anchor with a mouse. Engaging the link can display the target document, or start a download, or open a webpage.

Returning again to FIG. 3, the right half 302 has several offers to-sell equipped with clickable hyperlink button controls, e.g., 304-707. Some button controls say "Install Now" and others say "Enroll Now". Clicking on these buttons will take the user to the respective providers' websites where they can purchase, download, and install the respective applications. E.g., a security suite like anti-virus, an identity theft monitoring service, a cloud type backup service, and a specialized toolbar. Clicking on a "Learn More" link 308-310 will merely cause more information to be displayed in the conventional browser so a purchasing decision can be made by the user.

The right half 302 illustrated in FIG. 3 is an "additional services offered" bulletin-board, populated in this example with four offer-to-sell hypertext posters 312-715. More than the four shown could be included and accessed by manipulating a scroll bar 716. Such posters can be dynamic and ever-changing in their offers and sponsoring organizations. The sponsoring organization controls which posters are offered and how.

Sponsors, providers, and other advertisers can be charged for their appearances in offer-to-sell hypertext posters 312-315, with a premium being charged for the first few positions on top. A check of user computer 202 (FIG. 2) is made to see if any of these services offered are already installed and functioning. Once the respective service is purchased and installed, the "Install Now" legend on the hyperlink control button changes from red to a green, "Launch" button or something equivalent for centralized, one-click access.

The left half 301 also presents an opportunity to do a bit of marketing. When GUI 300 is initially opened by a new user, links 320, 322 to various sponsors can be pre-installed. Eventually, these links will be populated by financial and other kinds of accounts at websites where the user has user-ID and password credentials established. Font colors can be used to indicate which of these links is suggested and which are registered in the application.

Users can navigate to a website that requires their user credentials by using conventional browser 214, or by clicking on the respective link 320, 322 in GUI 300. Either action will result in security browser 218 putting up a SECURE VIEW window. If this is the first use of system 200 in a while to access a secure website, agent program 230 will pop-up a dialog box requiring the user to input their master pin, e.g., digital signature 223. The target website opens immediately in the SECURE VIEW window. If a window in the conventional browser 214 was used, that window closes to prevent confusing the user and to prevent transactions outside the SECURE VIEW window.

Links 320, 320 represent "single-click access" to the secure websites visited by the user and the necessary mechanics to enable customized access are stored in website database 224 (FIG. 2). The corresponding user credentials for these websites are securely stored in password store 222.

The logic to implement the functions described for GUI 300 are embodied in DLL files and loaded in user computer 202 as portable executables (PE) in the WINDOWS operating system, for example. System functions like presenting windows and pop-ups, supporting pointing devices, responding to clickable links and buttons, opening up network sessions and accessing websites, are all conventional technologies provided by widely available commercial products like Microsoft's WINDOWS operating system.

Figure 4:
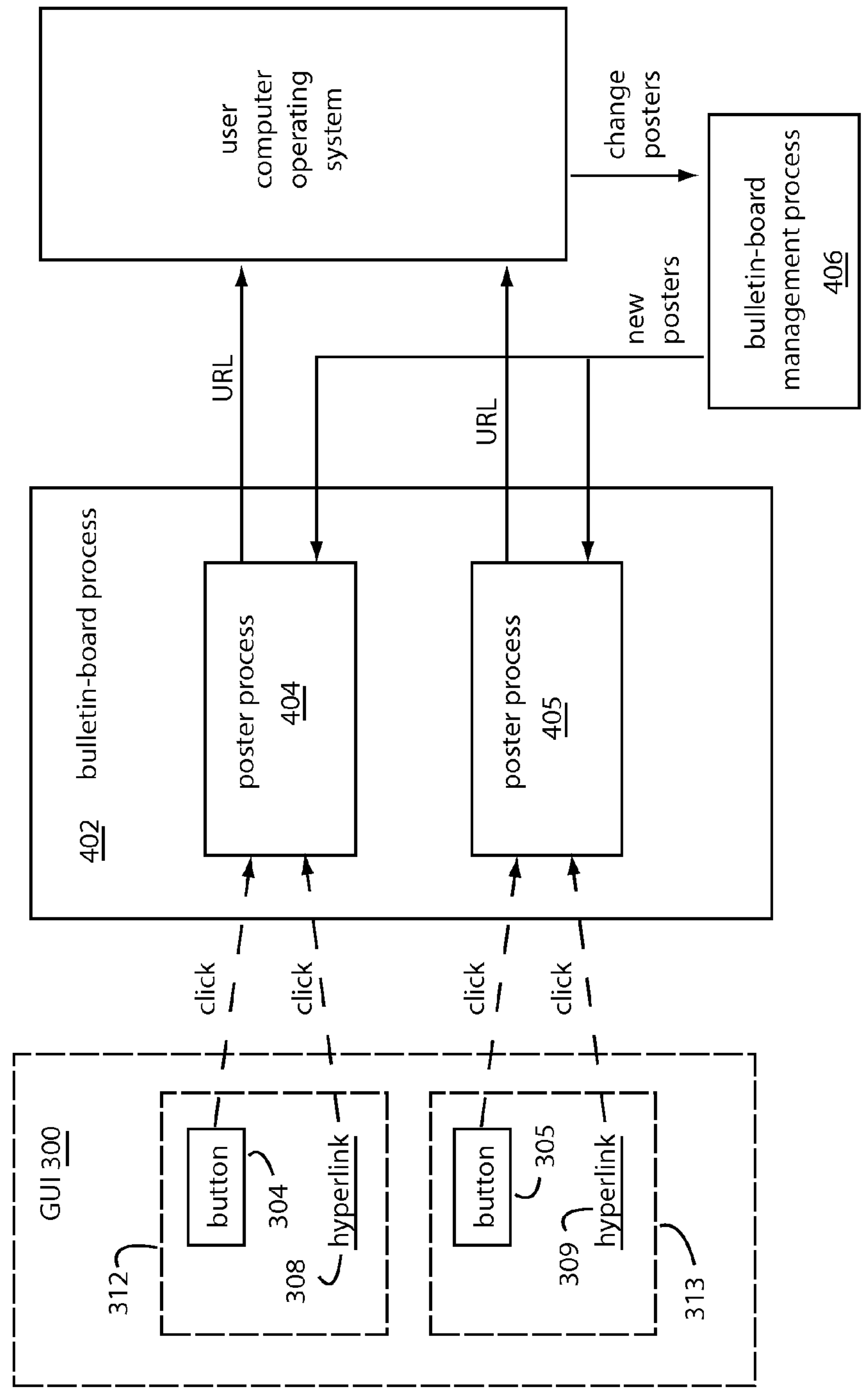
FIG. 4 is a functional block diagram of the mechanisms incorporated in the systems herein that are needed to support the GUI and its hyperlinks, buttons, bulletin-board, and posters.

FIG. 4 represents a mechanism 400 incorporated into system 200 (FIG. 2) to support GUI 300 and its hyperlinks 308-310, buttons 304-707, bulletin-board 302, and posters 312-315. In one embodiment, these mechanisms are implemented as PE files in DLL's 404 (FIG. 4) loaded, as needed, by the operating system. In GUI 300 as it's displayed on a user screen, clicking on a control button 304 or 305, or a hyperlink 308 or 309, in a poster 312 or 313, will send a trigger to a bulletin-board process 402. A corresponding poster process 404 or 405 has the particulars of the target URL to go to and such is forwarded to the user computer operating system. If a request to change, update, add, or remove a poster is received by the user computer operating system 406, a bulletin-board management process 406 will install the appropriate poster process and update the GUI 300.

FIGS. 5A-5B represent a user authentication system, and is referred to herein by the general reference numeral 500. FIG. 5A represents an initial condition in which one of many user clients 502 has connected through the Internet 504 to a network server 106. The user clients 502 typically include a processor and memory 508, network interface controller (NIC) 510, an operating system 512 like WINDOWS, a browser 514 like INTERNET EXPLORER, and an input device 516 like a common keyboard and mouse. The browser 514 also allows the user clients 502 to visit third-party secure websites 520 that each require authentication from the user, e.g., a user ID and password.

Network server 506 can offer for download an ID vault (IDV) application program 522, and maintains a database 524 of registered IDV users. The IDV application program 522 can be sold, subscribed to, given away for free, offered as a prize or award, and/or provided on a disk or memory card.

FIG. 5B represents how user authentication system 500 is transformed by the installation of IDV application program 522 in user clients 502. An installation and registration process, when launched, builds an ID vault run-time client 530, a WINDOWS root certificate 532, and a globally unique identifier (GUID) 534. The WINDOWS X.509 certificate 532 is created for exclusive use by ID vault run-time client 530. There is no other root authority involved. The GUID 534 is a unique identifier earmarked exclusively for the particular installation of ID vault run-time client 530 on user client 502. When GUID 534 is created it is placed in WINDOWS root certificate 532. Network server 506 is called to create a PIN record and passes the GUID 534, the public key for WINDOWS root certificate 532, and a personal identification number (PIN) 536 provided by the user. These are forwarded in a message 538 to network server 506. The network server 506 creates a new user record 540 and stores it and others in user database 524. The particular user and their user client 502 are thereby registered.

FIG. 5C represents how the user authentication system 500 is transformed from that shown in FIG. 5B by the running of ID vault run-time client 530 in user client 502. When the user tries to open an account at a third-party website 520, a service in ID vault run-time client 530 is called to get a "protected" encryption key 542 needed to access a locked, local encrypted vault 544. That call passes a message 546 that includes a copy of GUID 534, a signature of GUID 534 using the private key for WINDOWS root certificate 532, and a freshly acquired PIN 548 (which is required to match the original PIN 536 used during registration for the user to be authenticated). Network server 506 then verifies that GUID 534 already exists in database 524, and if so, tests to see that the signature is correct using the public key previously supplied in new user record 540. It further tests to see that PIN 548 matches PIN 536 which was received previously in new user record 540. If the tests are successful, a "protected" encryption key 542 is sent to user client 502. Such "protected" encryption key 542 will expire after a limited time. But before it does expire, the user can automatically and transparently log-on to many secure third party websites 520 that its registered for.

The "protected" encryption key 542 the server returns is not the actual decryption key needed to unlock the secure files. The receiving client uses its certificate (private key) to actually decrypt key 542 and get the actual symmetric key that was used to encrypt the vault. In other words, the "protected" encryption key the server sends needs further processing by the client and its certificate before the response can be used to access the vault. The certificate and the key returned by the server are therefore strongly bound.

FIG. 5D represents how the user authentication system 500 is transformed from that shown in FIG. 5C by the routine use of ID vault run-time client 530 in user client 502. After the "protected" encryption key 542 is received, the local encrypted vault 544 can be unlocked. Thereafter, as browser 514 navigates to third party websites 520, ID vault run-time client 530 recognizes that a user ID and password 550 are needed. The local encrypted vault 544 stores all the user ID's and passwords 550 that were collected in previous sessions to automatically log-on to corresponding third party websites 520. Once logged on, the user client is given an access response 552.

GUID 534 is a randomly generated 528-bit integer represented by a 32-character hexadecimal character string. For example, "c12eb070-2be2-51df-8a39-0800200c9a66". The odds are that such number will be unique for all practical purposes. A GUID can be assumed to never be generated twice by any computer. Microsoft Windows uses GUID's internally to identify classes in DLL files. A script can activate a specific class or object without having to know the name or location of the Dynamic Linked Library that includes it. ActiveX uses GUID's to uniquely identify controls being downloading and installed in a web browser. GUID's can be obtained with a random-number generator, or based on a time. GUID's can also include some parts based on the hardware environment, such as the MAC address of a network card.

Certificates, like WINDOWS root certificate 532, support authentication and encrypted exchange of information on open networks such as the Internet, extranets, and intranets. The public key infrastructure (PKI) is used to issue and manage the certificates. Each WINDOWS root certificate 532 is a digitally-signed statement that binds the value of a public key to the identity of the person, device, or service that holds the corresponding private key. With conventional certificates, host computers on the Internet can create trust in the certification authority (CA) that certifies individuals and resources that hold the private keys. Trust in the PKI here is based on WINDOWS root certificate 532. Such certificates are conventionally used in secure sockets layer (SSL) sessions, when installing software, and when receiving encrypted or digitally signed e-mail messages.

The Update Root Certificates feature in Windows Vista is designed to automatically check the list of trusted authorities on the Windows Update Website when this check is needed by a user's application. Ordinarily, if an application is presented with a certificate issued by a certification authority in a PKI that is not directly trusted, the Update Root Certificates feature will contact the Windows Update Website to see if Microsoft has added the certificate of the root CA to its list of trusted root certificates. If the CA has been added to the Microsoft list of trusted authorities, its certificate will automatically be added to the set of trusted root certificates on the user's computer.

When a certification authority is configured inside an organization, the certificates issued can specify the location for retrieval of more validation evidence. Such location can be a Web server or a directory within the organization.

A few of the technical and security details about the password vault used by embodiments of the present invention are important to understand here. Password vaults comprise the core private data storage. User applications store online account passwords, credit card information, addresses, and other user private data inside these vaults. As a consequence, the password vault is a critical part of a highly secured, and flexible architecture.

Password vaults are implementations of an abstracted "physical token" which is enhanced to make it more convenient to use without trading away any security features. In pure hardware tokens, data is typically stored in an XML file on the user's computer and is encrypted using a strong AES-256 key. Such vault key is stored in a remote server, and will only be given to a caller if protected by another key, and if a predetermined set of security requirements are strictly met.

Each web service in charge of managing and delivering vault keys is referred to herein as a "PIN" service. One of the most important requirements in password vault design is to guarantee ease of use. The PIN service provides such by requiring the users to remember only one simple secret PIN number four to nine characters long. This is the only thing that a user has to remember and enter to get access to all the other stored information.

One communication technology useful for transferring the vault keys between clients and servers is Windows Communication Foundation (WCF) over Simple Object Access Protocol (SOAP). E.g., with Web Services Security messages enabled, instead of transport level security. The protocol specifies how integrity and confidentiality can be enforced on messages and allows the communication of various security token formats, such as SAML, Kerberos, and X.509. Its main focus is the use of XML Signature and XML Encryption to provide end-to-end security. An important security requirement is that each vault must not be usable in any other machine. It must be bound to the legitimate original machine where it was created, so it is not useful if moved. This requirement will prevent dictionary or brute-force attacks on the vault files.

An X.509 certificate is bound to a set of RSA public/private keys created at product install time. Such certificate is stored in the computer's certificate store. The private key of the X.509 certificate is set to be non-exportable, Meaning that this certificate is prohibited from being be exported and installed on any other computer. A client-side certificate is used to authenticate each user with the PIN service. This can guarantee, that only a particular provider's client software can talk to the PIN service. The following table summarizes the security details of the encryption keys.

| Key | Location | Usage |
|---|---|---|
| Client keys (asymmetric keys) Algorithm: RSA Private Key Size: 2048 | User's computer certificate store | This cert is used by client/server to authenticate the client application that uses the PIN service. The RSA private key bound to the certificate is used to decrypt the vault key blob sent by the server. The client certificate will also store the token GUID so it can be reused if the vault file is removed accidentally or as result of an exceeded unsuccessful authentication request count. |
| Vault key (AES) stored in the server Algorithm: Rijndael Size: 256 | Persistent in the server and temporarily stored in computer's memory (in a .NET secure string) | Used by the client to decrypt the data in the vault file. The encryption key is sent by the server protected by the client's RSA private key bound to the X.509 certificate-- so that the vault key can only be used by the holder of the certificate (and its RSA private key). |

Maximum security is needed when communicating the keys over the networks. The PIN Service uses certificate-based message-level security to ensure the communication between the client and server is secure beyond plain transport (SSL). More information about WCF using WS-Security for securing messages is published at http://msdn.microsoft.com/en-us/library/ms733137(v=vs.110).aspx When each application is initialized, the public key of that certificate, along with the user's chosen PIN, are sent to the PIN service. The service stores a SHA1 hash of the PIN and public key in a SQL database. After the public key is stored, the server creates a vault key (AES 256) and encrypts it with the RSA public key sent by the client prior to storing it in the database.

When a user is to be authenticated, the secret PIN entered by the user is sent to the server along with the encryption signature of the token ID to the server. This is a unique identifier for each application installation. The server subsequently verifies the signature with the public key that was sent at PIN creation time. The server will only send back a vault key blob if the PIN is correct and the signature can be verified.

If the signature succeeds verification, the raw vault key is double encrypted using the client's certificate RSA public key. This strategy practically guarantees that when the vault key is returned by the server as a blob, the actual vault key can only be obtained after first decrypting that data blob using the client's certificate private key. This also ensures that if the key data were to be stolen from the PIN SQL database, no computer attack using it would succeed, as each client's private key is required to decrypt the vault key blob sent by the server.

The PIN service at PIN verification time is set to allow up to four attempts of an invalid PIN. The count is kept in the server, so if a user has multiple installations of an application, all of the failed PIN verification attempts are kept by the server in a single count. If the user unsuccessfully attempts to guess the PIN more than four times, further PIN entries are locked out. The application will thereafter delete the vault data file from the system and the server data will be reset to disallow even more aggressive attempts. If the vault data file were accidentally erased by the user, or if the vault file was erased as a result of exceeding the maximum number of attempts, such client will be directed recreate a blank vault data file with the same token ID so it can be used with the current installation the application.

In summary, online protection embodiments of the present invention provide subscribers to organizations a highly integrated desktop application with a dashboard set of services combining single-click access to user accounts and a bulletin-board of constantly refreshed posters offering a variety of related products and services.

FIG. 6 represents a computer network system 600 for defending thousands of online users against countless fraudsters and ever mutating malicious websites 602. A back-end security program application 604 is installed on a centralized "cloud" network server 606. Its job is to help provide shielding for a variety of online users with different kinds of popular user devices, e.g., a WINDOWS-type user device 608, an ANDROID-type user device 610, and an APPLE IOS-type user device 612. (These types are all highly familiar to artisans and the Public at large.)

Network server application 604 comprises many sets of software instructions 614-618 collected together to provide a centralized software-as-a-service (SaaS) 620. Software instruction set 604 responds near identically to network requests from very different kinds of user devices. It recognizes and adapts to requests coming from ANDROID-type, APPLE IOS-type, and MICROSOFT WINDOWS-type user devices. Any responses are appropriately formatted according to the original mode of contact. Unfortunately, individual hostings must be crafted for each, and the expense of that will limit the commercial implementations to the most popular of platforms.

Software instruction set 615 generates and distributes a corresponding trusted root certificate memory recording and personal identification number (PIN) upon the subscriber enrollment of each one of the user devices.

When the user performs a search in their regular web browser using the safe search engine 633, software instruction set 616 retrieves heuristics about each search result from a third-party security provider, such as InfoSpace®. Based on these heuristics, it calculates the confidence scores related to financial fraud and the acceptability of risk to said users. It then displays the confidence score next to each search result pointing to a particular website 602.

Software instruction set 617 investigates, surveys, and watches websites 622 that have been reported by their corresponding URL's as having been used by, or are presently being visited by, or that are predetermined as likely to be visited by any one of said user devices. An independent maintenance crew is typically given access to this job to help in keeping an accurate list of trusted websites 622.

Software instruction set 618 maintains a trusted network database 624 of website URL's calculated to belong to financial websites 622 that can be trusted and present acceptable levels of fraud and financial risk to its visitors.

In alternative embodiments, Software instruction set 616 investigates, surveys, and watches websites 622 that have been reported by their corresponding URL's as having been used by, or are presently being visited by, or that are predetermined as likely to be visited by any one of said user devices. An independent maintenance crew is typically given access to this job to help in keeping an accurate list of trusted websites 622. Alternatively, automated heuristics provided by a third-party can be used, as opposed to being maintained by a dedicated crew of people.

In a combination of safe-search and trusted network technologies, software instruction set 617 calculates confidence scores related to financial fraud and the acceptability and risk to said users of visiting particular websites 602 and 622 by their corresponding URL's. Software instruction set 618 maintains a trusted network database 624 of website URL's calculated to belong to financial websites 622 that can be trusted and present acceptable levels of fraud and financial risk to its visitors. Alternative embodiments will keep safe-search and trusted network technologies separate and distinct.

SaaS 620 executes on an otherwise conventional network server 626 positioned in a network to provide centralized security services for subscribers.

Each user device 608, 610, 612 has installed an appropriate user device application 630 for shielding its private online user from fraudsters and malicious websites 602. Device application (app) typically comprises several sets of downloadable software instructions 631-636. These enable the user devices to communicate through conventional communications network interfaces to the Internet. It is expected there could be millions of such devices and simultaneous connections.

Software instruction set 631 obtains and stores trusted root certificates and a personal identification number (PIN) from the SaaS 620 upon enrolment. Software instruction set 632 constructs a password manager as an interactive graphic on a screen, and that requires said PIN from said user in order to thereafter automatically supply conforming passwords to a trusted websites. Software instruction set 633 constructs a search engine able to interact with said user and to find and report back websites. Or, the search engine can be constructed and hosted on the back-end, as opposed to the user's device. A web browser on the user's device then renders the search engine web site.

Software instruction set 634 renders on-screen an services suite as a graphical user interface (GUI) visually arranged in a dashboard configuration for automated user access to a limited set of services electronically represented as a bulletin-board of developing collection of posters, and constructed to offer the user a diversity of interrelated products and services. Software instruction set 635 manages a plurality of passwords corresponding to financial websites subscribed to by a user and to provide them automatically to any website URL recognized in the trusted network database. Software instruction set 636 limits browser navigation by a user visiting a financial website the trusted network database to functioning solely through a secure view browser, e.g., security browser 218 (FIG. 2).

It is important to understand that the trusted root certificate memory recording and PIN establish two security factors embedded within for user authentication protocols over the communications network interface.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A computer network system for defending online users against fraudsters and malicious websites, comprising:

a network server for shielding a variety of online users from fraudsters and malicious websites, comprising software instructions for a centralized software-as-a-service (SaaS) to:

respond to network requests from user devices operating variously under at least one operating systems;

generate and distribute a corresponding trusted root certificate memory recording and personal identification number (PIN) on enrollment of each one of said user devices;

investigate, survey, and watch websites that have been reported by their corresponding URL's as having been used by, or are presently being visited by, or that are predetermined as likely to be visited by any one of said user devices; and maintain a trusted network database of website URL's calculated to belong to financial websites that can be trusted and present acceptable levels of fraud and financial risk to its visitors; and a user device application for shielding a particular online user from fraudsters and malicious websites, comprising downloadable software instructions for enabling a user device having a communications network interface and operating under at least one operating system to:

obtain and store a trusted root certificate memory recording and a personal identification number (PIN) from the SaaS;

construct a password manager as an interactive graphic on a screen, and that requires said PIN from said user in order to thereafter automatically supply conforming passwords to a trusted websites;

construct a safe search engine able to interact with said user and to calculate confidence scores for each search result displayed to the user; and render on-screen a services suite as a graphical user interface (GUI) visually arranged in a dashboard configuration for automated user access to a limited set of services electronically represented as a bulletin-board of developing collection of posters, and constructed to offer the user a diversity of interrelated products and services;

manage a plurality of passwords corresponding to financial websites subscribed to by a user and to provide them automatically to any website URL recognized in the trusted network database; and limit browser navigation by a user visiting a financial website the trusted network database to functioning solely through a secure view browser;

wherein, said trusted root certificate memory recording and PIN establish two security factors embedded within for user authentication protocols over the communications network interface;

wherein users can be prevented from accessing potentially malicious websites.

2. The system of claim 1, wherein the user device application further comprises software instructions to:

implement said GUI as a display window on a user display, and configure it for presentation as a window split with a first part and a second part;

dispose a list of financial account hyperlinks in said first part and configure it to provide user access via a pointing device and a browser display window to preregistered financial websites with previously established user credentials for secure network sessions;

dispose a list of non-financial account hyperlinks in said first part and configure them to provide access via said pointing device and a browser display window to preregistered non-financial websites with previously established user credentials for secure network sessions;

place an electronic bulletin-board in said second part of said window; and position at least one offer-to-sell hypertext poster for viewing in the bulletin-board;

wherein the personal data protection suite is configured to be accessible only to subscribers belonging to a single organization.

3. The system of claim 1, wherein the user device application further comprises software instructions to:

include an install-now hyperlink button and a learn-more link, wherein each mechanize a link to a third party website configured to be launched thereby and to complete a download and an installation of a corresponding user application program to the user device.

4. The system of claim 1, wherein the user device application further comprises software instructions to:

install a bulletin-board management processor to populate a bulletin-board with hypertext posters, wherein each hypertext poster is supported by a poster processor to mechanize a link via a browser window to corresponding third-party websites, and that are configured to be launched thereby to complete a download and installation of a respective user application program to the user device.

5. The system of claim 2, wherein the user device application further comprises software instructions to:

include a hyperlink control button in each offer-to-sell hypertext poster, and configured to link via a browser window to a third-party website for an application download if such application is not already installed on the user computer.

6. The computer network system of claim 1, further comprising a user device application for shielding a particular online user from fraudsters and malicious websites, comprising downloadable software instructions to:

implement an interactive graphical user interface (GUI) as a display window on a user display connected to a user device and pointing device, and configured for presentation of a window split into a first part and a second part;

place a financial account list of hyperlinks in said first part and configure them to provide user access via said pointing device and a browser display window to preregistered financial websites with previously established user credentials for secure network sessions;

place a non-financial account list of hyperlinks also disposed in said first part and configure them to provide access via said pointing device and a browser display window to preregistered non-financial websites with previously established user credentials for secure network sessions; and visually positioning at least one offer-to-sell hypertext in said second part of said split window and including an install-now hyperlink button and a learn-more link, wherein each offer-to-sell hypertext mechanizes a browser link to a third party website, and each offer-to-sell hypertext is configured to be launched thereby to complete a download and installation of a corresponding user application program to the user device.

* * * * *